United States Patent
Albanese

(12) 
(10) Patent No.: US 10,677,000 B2
(45) Date of Patent: Jun. 9, 2020

(54) ACTUATABLE FINGERBOARD LATCH ASSEMBLY

(71) Applicant: AMERICAN BLOCK, Houston, TX (US)

(72) Inventor: Jesse Tyler Albanese, Houston, TX (US)

(73) Assignee: American Block, Houston, TX (US)

( * ) Notice: Subject to any disclaimer, the term of this patent is extended or adjusted under 35 U.S.C. 154(b) by 164 days.

(21) Appl. No.: 15/641,000

(22) Filed: Jul. 3, 2017

(65) Prior Publication Data

US 2018/0002994 A1    Jan. 4, 2018

Related U.S. Application Data

(60) Provisional application No. 62/358,110, filed on Jul. 4, 2016.

(51) Int. Cl.
| | |
|---|---|
| *E21B 19/14* | (2006.01) |
| *F16L 3/00* | (2006.01) |
| *E21B 19/00* | (2006.01) |
| *G01D 11/30* | (2006.01) |

(52) U.S. Cl.
CPC ........... *E21B 19/14* (2013.01); *F16L 3/00* (2013.01)

(58) Field of Classification Search
CPC . E21B 19/14; E21B 19/00; F16L 3/00; G01D 11/30
See application file for complete search history.

(56) References Cited

U.S. PATENT DOCUMENTS

| | | |
|---|---|---|
| 2005/0092524 A1 | 5/2005 | Herst |
| 2013/0032405 A1 | 2/2013 | Braxton |
| 2016/0076920 A1 | 3/2016 | Newton et al. |

FOREIGN PATENT DOCUMENTS

| | | |
|---|---|---|
| WO | 2012012559 A2 | 1/2012 |
| WO | 2013141697 A2 | 9/2013 |

OTHER PUBLICATIONS

On Jul. 23, 2019 accessed definition of Piston via https://www.thefreedictionary.com/Piston (Year: 2019).*
International Search Report and Written Opinion dated Oct. 24, 2017, for International Application No. PCT/US2017/040603.

* cited by examiner

*Primary Examiner* — D. Andrews
*Assistant Examiner* — Manuel C Portocarrero
(74) *Attorney, Agent, or Firm* — Conley Rose, P.C.

(57) ABSTRACT

A fingerboard latch assembly includes a latch body, a finger member pivotably connected to the latch body at a first pin, and an actuator assembly coupled to the finger member, wherein the actuator assembly is configured to actuate the finger member from a closed position to an open position in response to the application of fluid pressure to the actuator assembly.

22 Claims, 15 Drawing Sheets

ACTUATABLE FINGERBOARD LATCH ASSEMBLY

CROSS-REFERENCE TO RELATED APPLICATIONS

This application claims benefit of U.S. provisional patent application Ser. No. 62/358,110 filed Jul. 4, 2016, and entitled "Actuatable Fingerboard Latch Assembly," which is hereby incorporated herein by reference in its entirety.

STATEMENT REGARDING FEDERALLY SPONSORED RESEARCH OR DEVELOPMENT

Not applicable.

BACKGROUND

Drilling systems are sometimes utilized for the extraction of hydrocarbons from a subterranean earthen formation via a drilling wellbore into the formation. In some applications, drilling systems comprise a drilling rig having a mast or derrick extending therefrom. In some applications, the mast includes a rack assembly or fingerboard for storing drill pipes in a setback position spaced from a longitudinal axis of a borehole extending beneath the drilling rig. The fingerboard assembly may include multiple racking fingers for racking or storing multiple drill pipes in a substantially vertical disposition in the setback position. Each racking finger of the fingerboard assembly may include one or more actuatable fingerboard latches for allowing or denying movement of drill pipes into or out of the racking finger of the fingerboard assembly. Particularly, in some applications each fingerboard latch includes a latch or finger member having a closed position restricting the movement drill pipes through the racking finger and an open position allowing movement of drill pipes through the racking finger. In certain applications, the finger member of the fingerboard latch is actuatable between the closed and open positions via an actuator of the fingerboard latch.

SUMMARY

An embodiment of a fingerboard latch assembly comprises a latch body, a finger member pivotably connected to the latch body at a first pin, and an actuator assembly coupled to the finger member, wherein the actuator assembly is configured to actuate the finger member from a closed position to an open position in response to the application of fluid pressure to the actuator assembly. In some embodiments, the actuator assembly comprises a cylinder, a piston rod slidably disposed in the cylinder, wherein the piston rod comprises a first end and a second end, and a link member pivotably coupled to the first end of the piston rod. In some embodiments, the piston rod comprises a piston disposed at the second end of the piston rod, and wherein the piston comprises a circular piston face configured to receive fluid pressure from a sealed chamber disposed in the cylinder. In certain embodiments, the finger member is pivotably coupled to the link member at a second pin. In certain embodiments, the finger member comprises a main body portion and a finger extension portion, wherein the finger body portion comprises a greater lateral width than a lateral width of the finger extension portion. In certain embodiments, the latch body comprises a slot extending between a pair of lateral sides of the latch body, and wherein the main body portion of the finger member is disposed in the slot of the latch body. In some embodiments, the finger member comprises a main body portion and a finger extension portion, and wherein a lateral side of the finger extension portion is disposed at an angle relative to a central axis of the finger member. In some embodiments, a shoulder is formed between the main body portion and the finger extension portion of the finger member.

An embodiment of a fingerboard latch assembly comprises a latch body, a finger member pivotably connected to the latch body at a first pin, and an actuator assembly coupled to the finger member, wherein the actuator assembly comprises a central axis and is configured to rotate the finger member about a rotational axis between a closed position and an open position, wherein the longitudinal axis of the actuator assembly is laterally offset from the rotational axis. In some embodiments, the actuator assembly comprises a piston slidably disposed in a cylinder, and wherein the piston comprises a central axis disposed coaxial with the central axis of the actuator assembly. In some embodiments, the actuator assembly is configured to actuate the finger member between the closed position and the open position in response to the application of fluid pressure to a terminal end of the piston. In certain embodiments, the actuator assembly comprises a piston rod extending from the piston, a rod link pivotably coupled to an end of the piston rod, and wherein the rod link is pivotably coupled to the finger member at a second pin. In certain embodiments, the fingerboard latch assembly further comprises a piston rod guide coupled to an upper end of the cylinder, and wherein the piston rod guide comprises a wiper seal configured to wipe an outer surface of the piston rod. In some embodiments, the rod link comprises a central axis that is disposed at an angle relative to the central axis of the piston. In some embodiments, the piston comprises a circular piston face configured to receive fluid pressure from a sealed chamber disposed in the cylinder. In certain embodiments, the finger member comprises a main body portion and a finger extension portion, wherein the finger body portion comprises a greater lateral width than a lateral width of the finger extension portion.

An embodiment of a fingerboard latch assembly comprises a latch body, a finger member pivotably connected to the latch body at a first pin, and an actuator assembly coupled to the finger member and comprising a piston slidably disposed in a cylinder, wherein the actuator assembly is configured to actuate the finger member between a closed position and an open position in response to the application of fluid pressure to a terminal end of the piston. In some embodiments, the piston comprises a circular piston face configured to receive fluid pressure from a sealed chamber disposed in the cylinder. In some embodiments, the fingerboard latch assembly further comprises a biasing member configured to provide a biasing force against an annular shoulder of the piston to actuate the finger member from the open position to the closed position. In certain embodiments, the fingerboard latch assembly further comprises a piston rod guide coupled to the cylinder, wherein the piston rod guide comprises a vent port configured to provide fluid communication between the cylinder and the surrounding environment. In certain embodiments, the fingerboard latch assembly further comprises a cylindrical shroud covering the vent port of the piston rod guide. In some embodiments, the fingerboard latch assembly further comprises a receptacle extending into an inner end of the finger member, a position sensor disposed within the receptacle, wherein the position sensor is configured to measure a position of the finger member.

BRIEF DESCRIPTION OF THE DRAWINGS

For a detailed description of exemplary embodiments, reference will now be made to the accompanying drawings in which.

DETAILED DESCRIPTION

Figure 1:
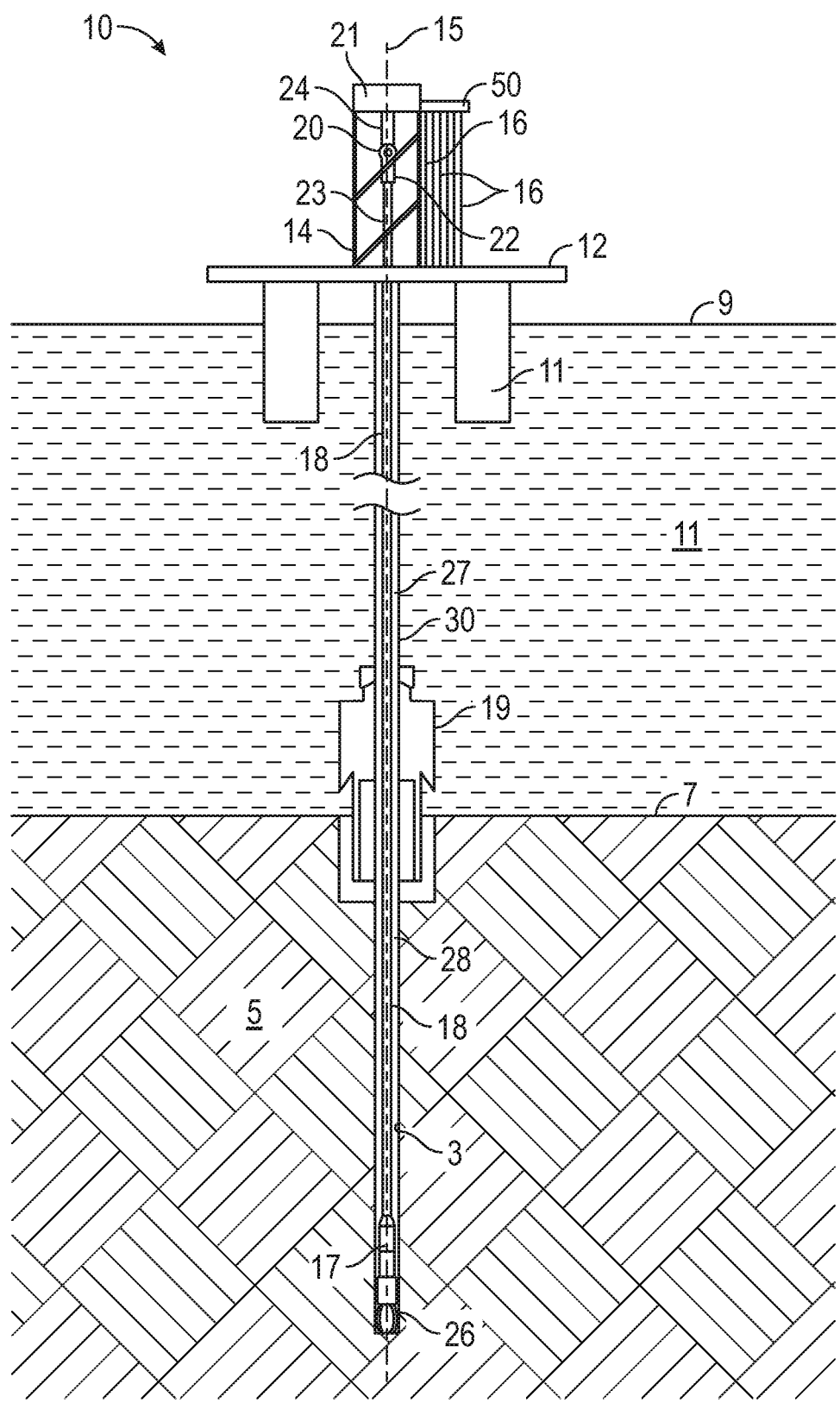
FIG. 1 is a schematic view of an embodiment of a drilling system including a fingerboard assembly in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring now to FIG. 1, a schematic view of an offshore drilling system 10 including a pipe storage or fingerboard assembly 50 is shown. Drilling system 10 has a central or longitudinal axis 15 and generally comprises a surface vessel or semi-submersible drilling rig 11 including a rig floor 12 and a derrick or mast 14. In the embodiment of FIG. 1, surface vessel 11 comprises a semi-submersible drilling rig 11; however, in other embodiments, surface vessel 11 may comprise other types of offshore vessels known in the art, including gravity based structures, drilling ships, and the like. In still other embodiments, drilling system 10 may comprise a surface drilling system disposed onshore. Drilling of oil and gas wells may be carried out by a string of drill pipes connected together by drill pipes or tubular members 16 so as to form a drill string 18 extending subsea from platform 11 and into a borehole 3 extending into a subterranean earthen formation 5 from a sea floor 7.

In this embodiment, disposed within mast 14 is a travelling block 20 coupled with a drive 22 (e.g., a top drive). As will be discussed further herein, travelling block 20 is supported by a plurality of drilling cables 24 suspended from a crown block (not shown) of a tubular handling system 21 disposed at an upper end of mast 14. In some embodiments, tubular handling system 21 comprises a crown block, associated pulleys and cables, and a winch system (disposed at the rig floor 12) for manipulating the position of travelling block 20 and drive 22. Travelling block 20 and drive 22 are configured to longitudinally displace and apply torque to a longitudinally upper end of drill string 18. In the embodiment shown in FIG. 1, a bottom hole assembly (BHA) 17 and a drill bit 26 are connected to a lower end of drill string 18. In certain embodiments, the bit 26 is rotated by rotating the drill string 18 via drive 22 and/or with a downhole motor (e.g., downhole mud motor) disposed in the BHA 17.

In some embodiments, drilling fluid, also referred to as drilling "mud," is pumped by mud recirculation equipment (e.g., mud pumps, shakers, etc.) disposed on the rig floor 12 of vessel 11. Particularly, the drilling mud is pumped at a relatively high pressure and volume through a drilling kelly 23 coupled with drive 22 and down the drill string 18 to the drill bit 26, where the drilling mud exits the drill bit 26 through nozzles or jets in face of the drill bit 26. The pumped drilling mud then returns to the vessel 11 at the sea surface 9 via an annulus 28 between the drill string 18 and the borehole 3, through a blowout preventer (BOP) 19 at the sea floor 7, and up an annulus 27 between the drill string 18 and a marine riser 30 extending through the sea 11 from the blowout preventer 19 to the vessel 11. At the sea surface 9, the drilling mud is cleaned and then recirculated by the recirculation equipment. The drilling mud is used to cool the drill bit 26, to carry cuttings from the base of the borehole to the vessel 11, and to balance the hydrostatic pressure in the rock formations.

In this embodiment, fingerboard assembly 50 of drilling system 10 is disposed above rig floor 12 and coupled to and extending radially from (relative longitudinal axis 15) mast 14. Particularly, fingerboard assembly 50 is configured to store one or more drill pipes 16 in a "setback" position radially spaced from longitudinal axis 15 of drilling system 10. In this arrangement, drill pipes 16 stored in the setback position may be conveniently moved into alignment with longitudinal axis 15 to couple with the other drill pipes 16 forming drill string 18 when tripping into the borehole 3. Similarly, when tripping out of borehole 3, drill pipes 3 of drill string 18 may be successively decoupled from drill string 18 and stored in the setback position via fingerboard assembly 50. Although in this embodiment fingerboard assembly 50 stores drill pipes 16, fingerboard assembly 50 may store tubular members other than drill pipes 16, such as drill collars and casing joints.

Figure 2:
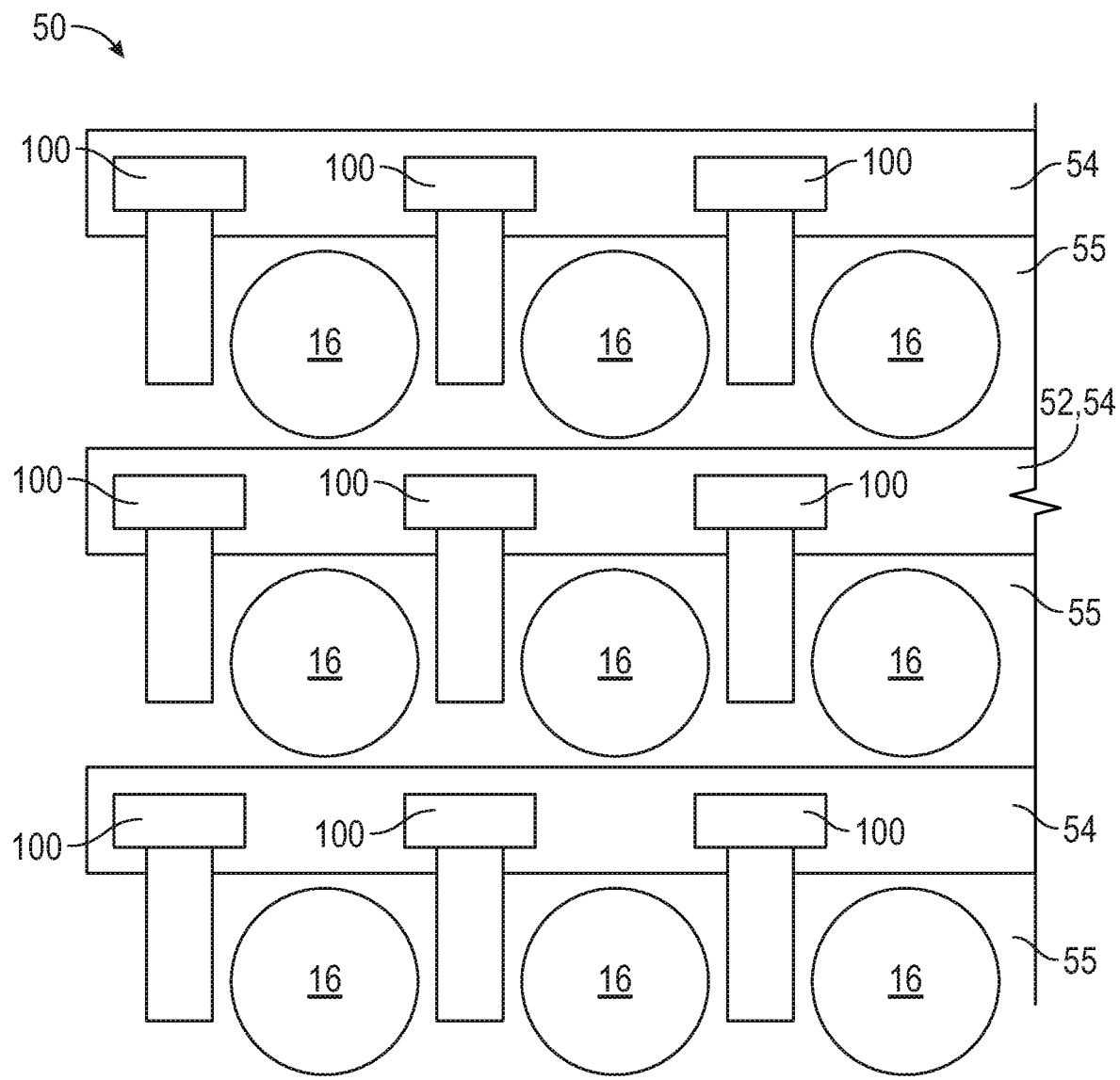
FIG. 2 is a top view of an embodiment of a fingerboard assembly of the drilling system of FIG. 1 in accordance with principles disclosed herein.

Referring to FIGS. 1 and 2, a schematic top view of the fingerboard assembly 50 of the drilling system 10 of FIG. 1 is shown in FIG. 2. In the embodiment of FIG. 2, fingerboard assembly 50 comprises a racking board or "fingerboard" 52 configured to receive an upper end of each drill pipe 16 stored in the setback position for securing each stored drill pipe 16 to the fingerboard assembly 50 with each drill pipe 16 disposed in a substantially vertical position. Particularly, fingerboard 52 comprises a plurality of elongate and laterally spaced racking fingers 54 and a plurality of elongate storage passages or racking slots 55 disposed between each pair of adjacently disposed fingers 54, where each racking slot 55 receives receiving a plurality of vertically disposed pipes 16. In this arrangement, each racking finger 54 includes a plurality of fingerboard latch assemblies 100 spaced along the axial length of the racking finger 54. As will be discussed further herein, fingerboard latch assemblies 100 are actuatable to selectively allow or deny the passage of the upper ends of drill pipes 16 through racking slots 55, thereby allowing for the individual positioning and storage of pipes 16 within each passage 55. In other words, individual racking fingers 54 allow for the storage of a plurality of pipes 16 within racking slots 55, and fingerboard latch assemblies 100 of the racking finger 54 provide for individual positioning of the pipes 16 stored in the racking slot 55.

Referring to FIGS. 2-7, an embodiment of an actuatable fingerboard latch assembly 100 of the fingerboard assembly 50 of FIG. 2 is shown in FIGS. 3-7. As discussed above, one or more fingerboard latch assemblies 100 may be coupled to a racking finger 54 of the fingerboard assembly 50 for allowing selective positioning and manipulation of individual pipes 16 stored in the fingerboard 52 of assembly 50. Although in the embodiment of FIGS. 3-7 fingerboard latch assemblies 100 are used with fingerboard assembly 50 described above, in other embodiments, fingerboard latch assemblies 100 may be used with other fingerboard or manipulation assemblies.

In this embodiment, fingerboard latch assembly 100 generally includes a latch body or base 102, an actuator assembly 200, and a finger or latch member 300. Latch body 102 of fingerboard latch assembly 100 includes a first or upper longitudinal end 104, a second or lower longitudinal end 106, an inner lateral end 103, and an outer lateral end 105. A generally rectangular finger slot 108 that receives latch member 300 extends into latch body 102 from upper longitudinal end 104 to an inner surface 110. In this embodiment, finger slot 108 extends laterally between the inner and outer ends 103 and 105 of latch body 102.

In this embodiment, the laterally inner end 103 of latch body 102 faces or is disposed adjacent the corresponding racking slot 55 through which fingerboard assembly 100 selectively allows for the displacement of drill pipes 16 therethrough. Particularly, finger member 300 of fingerboard latch assembly 100 extends into the racking slot 55 formed by the racking finger 54 to which assembly 100 is coupled, and thus, selectively allows the movement of drill pipes 16 through the corresponding racking slot 55. The extension of finger slot 108 into latch body 102 from upper longitudinal end 104 forms a pair of flanking latch body arms 112 that extend longitudinally between inner surface 110 and the upper longitudinal end 104 of latch body 102. In this embodiment, a plurality of apertures 113 are formed in latch body arms 112 to reduce the weight of latch body 102. In addition, latch body 112 includes a cylindrical pin 114 extending laterally through finger slot 108 and received in latch body arms 112. Pin 114 provides a pivotable or rotatable connection between finger member 300 and latch body 102. In this manner, finger member 300 may be rotated relative latch body 102 about an axis of rotation 115 (shown in FIG. 3) extending through pin 114. In other words, in this embodiment, rotational axis 115 is disposed coaxial with a longitudinal or central axis of pin 114.

In this embodiment, latch body 102 of fingerboard latch assembly 100 also includes a first or upper centrally disposed bore 116 and a second or lower centrally disposed bore 118. Further, a generally rectangular window 120 is disposed longitudinally between the upper bore 116 and lower bore 118 for providing access to components of actuator assembly 200 of fingerboard latch assembly 100. Particularly, upper bore 116 extends longitudinally between inner surface 110 and window 120 while lower bore 118 extends longitudinally between window 120 and the longitudinal lower end 106 of latch body 102. The lower bore 118 of latch body 102 receives the upper end of actuator assembly 200 therein and includes a releasable connector 122 (shown in FIG. 4) disposed in an aperture 124 extending radially into latch body 102, where connector 122 releasably connects the actuator assembly 200 to the latch body 102. In this embodiment, releasable connector 122 comprises a threaded fastener that threadably engages an inner surface of aperture 124; however, in other embodiments, other mechanisms may be used for releasably coupling latch body 102 with actuator assembly 200. In this embodiment, fastener 122 may be screwed into physical engagement with an outer surface of a component of the actuator assembly 200 disposed in lower bore 118 to releasably couple actuator assembly 200 with latch body 102.

In this embodiment, actuator assembly 200 of fingerboard latch assembly 100 has a central or longitudinal axis 205 (shown in FIG. 5) and generally includes an outer housing or cylinder 202, a piston rod guide 210, a cylinder shroud 226, a piston rod 230, and a link member 260. Actuator assembly 200 is generally configured to selectably actuate finger member 300 from a first, closed, or extended position 201 (shown in FIGS. 4 and 5) with finger member 300 extending laterally (i.e., substantially orthogonal to longitudinal axis 205) from latch body 102, to a second, open, or retracted position 203 (shown in outline in FIG. 7) with finger member 300 extending longitudinally (i.e., substantially parallel with longitudinal axis 205) from latch body 102. Particularly, when finger member 300 is disposed in the closed position, movement of drill pipes 16 through the racking slot 55 is restricted; and when finger member 300 is disposed in the open position, movement of drill pipes 16 through the racking slot is permitted.

In this embodiment, cylinder 202 of actuator assembly 200 comprises a first or upper end 202A, a second or lower end 202B, a centrally disposed inner bore or passage 204 extending between ends 202A and 202B and defined by a generally cylindrical inner surface 206, and a generally cylindrical outer surface 208 extending between ends 200A and 200B. Rod guide 210 is generally cylindrical and includes a first or upper end 210A, a second or lower end 210B, a central bore or passage 212 extending between ends 210A, 210B and defined by a generally cylindrical inner surface 214, and a generally cylindrical outer surface 216 extending between ends 210A and 210B. Inner surface 214 of passage 212 includes a wiper seal assembly 218 for engaging the piston rod 230. In this embodiment, wiper seal assembly 218 restricts debris, dirt, or other contaminants from entering passage 212 of rod guide 210. In some embodiments, wiper seal assembly 218 may seal against piston rod 230. In this embodiment, the outer surface 216 of rod guide 210 includes a first or upper annular shoulder 220A and a second or lower annular shoulder 220B longitudinally spaced from upper shoulder 220A. The upper end 202A of cylinder 202 couples with an outer radial edge of lower shoulder 220B. In some embodiments, the upper end 202A of cylinder 202 seals against lower shoulder 220B to prevent direct fluid communication between passage 204 of cylinder 202 and the surrounding environment. Additionally, in this embodiment, rod guide 210 includes a plurality of circumferentially spaced breather or vent ports 222 extending radially between passage 212 and outer surface 216, providing for fluid communication between passage 212 of rod guide 210 and the surrounding environment.

In this embodiment, cylinder shroud 226 is generally cylindrical and extends between a first or upper end trapped or coupled between upper shoulder 220A of rod guide 210 and the lower end 106 of latch body 102, and a second or lower end that extends over or enshrouds the vent ports 222 of rod guide 210. Cylinder shroud 226 permits fluid communication between vent ports 222 and the surrounding environment via an annulus 228 formed between a cylindrical inner surface of shroud 226 and the outer surface 216 of rod guide 210. In this manner, vent ports 222 are protected from dirt, mud, or other debris from splashing against or otherwise clogging vent ports 222 while still permitting fluid communication between ports 222 and the surrounding environment.

Piston rod 230 of actuator assembly 200 is slidably disposed at least partially within passage 204 of cylinder 202 and passage 212 of rod guide 210, and includes a first or upper longitudinal end 232, a second or lower longitudinal end 234, and a generally cylindrical outer surface 236 extending between longitudinal ends 232 and 234. The lower longitudinal end 234 of piston rod 230 comprises a radially outwards extending piston 238, the outer surface 236 of which includes an annular seal assembly 239 that sealingly engages the inner surface 206 of cylinder 202. The sealing engagement of seal assembly 239 forms a first or upper chamber 207 and a second or lower chamber 209 in the bore 204 of cylinder 202, where fluid communication is restricted between chambers 207 and 209.

In this embodiment, the upper chamber 207 of cylinder 202 is in fluid communication with the surrounding environment via vent ports 222 of rod guide 210. The lower chamber 209 of cylinder 202 is isolated from the surrounding environment and is in selective fluid communication with a fluid pressure source. Particularly, a cylinder endcap 244 is sealingly coupled to the lower end 202B and includes a central bore or passage 246 extending therethrough that is in fluid communication with lower chamber 209. Passage 246 of endcap 244 may be coupled to a fluid pressure source for selectively applying fluid pressure to lower chamber 209.

In this embodiment, lower chamber 209 is in selective fluid communication with a pressurized gas source, and thus, actuator assembly 200 comprises a pneumatic actuator. However, in other embodiments, lower chamber 209 may be in selective fluid communication with a pressurized liquid source. In still other embodiments, actuator assembly 200 may comprise an electrical, mechanical, or other kinds of actuators known in the art.

In this embodiment, pressurized gas is communicated to lower chamber 209 to apply a pressure force to the lower end 234 of piston rod 234, where lower end 234 comprises a generally circular lower piston face 234 of piston 238 to displace piston rod 230 longitudinally upwards through bore 204 of cylinder 202 in the direction of the upper end 104 of latch body 102, which in-turn actuates finger member 300 from the closed position 201 to the open position 203. In this arrangement, the outer diameter of the piston face 234 of piston 238 is substantially equal or similar to the outer diameter of actuator assembly 200. Additionally, given that fluid pressure in lower chamber 209 acts against the entire circular face 234 of piston 238, the total area acted against by hydraulic pressure in chamber 209 is substantially equal or similar to the overall cross-sectional area of actuator assembly 200. In other words, the diameter of piston face 234 is maximized relative to the outer diameter of actuator assembly 200 and the lower end of fingerboard latch assembly 100, allowing for a relatively larger force to be applied against piston rod 230 from a given fluid pressure disposed in lower chamber 209. In this manner, actuator assembly 200 may actuate finger member 300 from the closed position 201 to the open position 203 with a relatively minimal or reduced amount of fluid pressure applied to assembly 200 relative to conventional fingerboard latch assemblies. Further, in this embodiment, piston 238 and piston rod 230 are "pushed" longitudinally upwards via a threshold fluid pressure in lower chamber 209. Thus, actuator assembly 200 is "pushed" via fluid pressure when finger member 300 is actuated into the open position 203 from the closed position 201. In some applications, finger member 300 is more often disposed in the closed position 201 over the operational life of fingerboard latch 100. In such applications, the "push-to-open" functionality provided by actuator assembly 200 minimizes the axial length of piston rod 230 exposed to the surrounding environment over the operational life of fingerboard latch 100, thereby protecting rod 230 from debris, corrosion and other issues that may result from exposure to the surrounding environment. Further, in this embodiment, wiper seal assembly 218 of rod guide 210 wipes the outer surface 236 of piston rod 230, thereby preventing dirt, mud, or other debris from entering passage 204 of cylinder 202 when piston rod 230 is displaced into bore 204 as finger member 300 is actuated from the open position 203 to the closed position 201. In some embodiments, one or more additional wiper seal assemblies (not shown) may be disposed in bore 204 of cylinder 202 for preventing contaminants from entering therein.

In this embodiment, actuator assembly 200 also includes a biasing member 229 disposed in the upper chamber 207 of cylinder 202 and configured to provide a biasing force against an annular shoulder 231 of piston 238 in the direction of the longitudinal lower end of fingerboard latch assembly 100. Biasing member 229 is configured to bias piston 238 towards a longitudinally lower position in bore 204 of cylinder 202, where finger member 300 is disposed in the closed position 201. Thus, finger member 300 is disposed in the closed position 201 until a sufficient or threshold fluid pressure is disposed in lower chamber 209 to displace piston 238 longitudinally upwards against the biasing force provided by biasing member 229, thereby actuating finger member 300 into the open position 203. In this manner, actuator assembly 200 comprises a single-acting actuator assembly 200 biased into a lower position with finger member 300 disposed in the closed position 201. Thus, in this embodiment actuator assembly 200 comprises a fail "closed" actuator where finger member 300 is biased into the closed position 201 absent threshold fluid pressure in lower chamber 209 to actuate finger member 300 into the open position 203. However, in other embodiments, actuator assembly 200 may be biased into a longitudinally upwards position with finger member 300 disposed in the open position 203. In still other embodiments, actuator assembly 200 comprises a double-acting actuator that relies on fluid pressure or another motive force (e.g., electrical energy with an electrical actuator, etc.) to actuate finger member 300 both from the closed position 201 to the open position 203, and from the open position 203 to the closed position 201.

In this embodiment, the upper end 232 of piston rod 230 extends through the upper end 210A of rod guide 210 and is coupled with a hinge connector 250 that couples link member 260 with piston rod 230. In this embodiment, the upper end 232 of piston rod 230 couples with hinge connector 250 via a releasable connector assembly or fitting 252 (shown in FIG. 6); however, in other embodiments, various mechanisms may be used for coupling piston rod 230 with hinge connector 250. Link member 260 includes a first or upper pin assembly 262 for pivotably coupling link member 260 with finger member 300 and a second or lower pin assembly 264 for pivotably coupling link member 260 with piston rod 230 via hinge connector 250. In this embodiment, pin assemblies 262 and 264 each include a cylindrical bushing 262B, 264B (shown in FIG. 6), and releasable connectors (e.g., cotter pins, etc.) 262C, 264C (shown in FIG. 6), respectively. In some embodiments, pin assemblies 262 and 264 of link member 260 may comprise spherical bearings.

In this embodiment, a longitudinal or central axis 265 of link member 260 is disposed at an angle θ (shown in FIG. 5) relative to the longitudinal axis 205 of actuator assembly 200, where the magnitude of angle θ may vary as finger member 300 actuates between the closed and open positions 201, 203, via the dual rotating actions of the pin assemblies 262 and 264. The axial misalignment provided by link member 260 allows cylinder 202, which includes a longitudinal axis disposed coaxial with longitudinal axis 205 of actuator assembly 200, and piston rod 230 to remain in coaxial alignment with longitudinal axis 205 as finger member 300 is actuated from the closed position 201 to the open position 203. Additionally, the axial misalignment provided by link member 260 allows the longitudinal axis 205 of actuator assembly 200 to be laterally offset a distance 200R relative to rotational axis 115. Thus, cylinder 202 and piston rod 230 need not pivot relative latch body 102 (latch body 102 being disposed coaxial with longitudinal axis 205) when finger member 300 is actuated between the closed position 201 and the open position 203, simplifying the connection between latch body 102 and the actuator assembly 200 while also maximizing the space efficiency of fingerboard latch assembly 100 by allowing the actuator assembly 200 to couple directly with latch body 102 at the lower end 106 of latch body 102.

Still referring to FIGS. 2-7, finger member 300 of fingerboard latch assembly 100 has a first or upper end 302, a second or lower end 304, an inner end 301, an outer end 303, and a pair of lateral sides 305. In some embodiments, finger member 300 may comprise a steel alloy; however in other embodiments, finger member 300 may comprise a composite material, such as Ultracomp UC-300 composite produced by TriStar Plastics Corp. of Shrewsbury, Mass. In this embodiment, finger member 300 includes a main body portion 306 extending from outer end 303 and a finger extension portion 308 extending from inner end 301. In this embodiment, the main body 306 of finger member 300 has a greater lateral width (i.e., the distance between lateral sides 305) than finger extension 308. Main body 306 of finger member 300 is received within the finger slot 108 formed between arms 112 of latch body 102 where a lateral side 305 of main body 306 is positioned directly adjacent an inner surface of a corresponding arm 112. Additionally, when finger member 300 is disposed in the closed position 201, a portion of the lower end 304 of the main body 306 is disposed directly adjacent or physically engages the inner surface 110 of finger slot 108.

In this embodiment, finger member 300 includes a first laterally extending aperture 310 for receiving pin 114 of latch body 102 and a second laterally extending aperture 312 for receiving the upper pin assembly 264 of link member 260. First aperture 310 is disposed proximal the outer end 303 of finger member 300 while second aperture 312 is disposed in a tab 313 of finger member 300 that extends downwards (towards the lower end 106 of latch body 102) from lower end 304. The positioning of first aperture 310 proximal outer end 303 of finger member 300 allows for an increased diameter of first aperture 310, and in-turn, pin 114, thereby providing a more robust and resilient hinged connection between finger member 300 and latch body 102. Further, second aperture 312 of finger member 300 provides a pivotable connection between finger member finger member 300 and link member 260.

Figure 3:
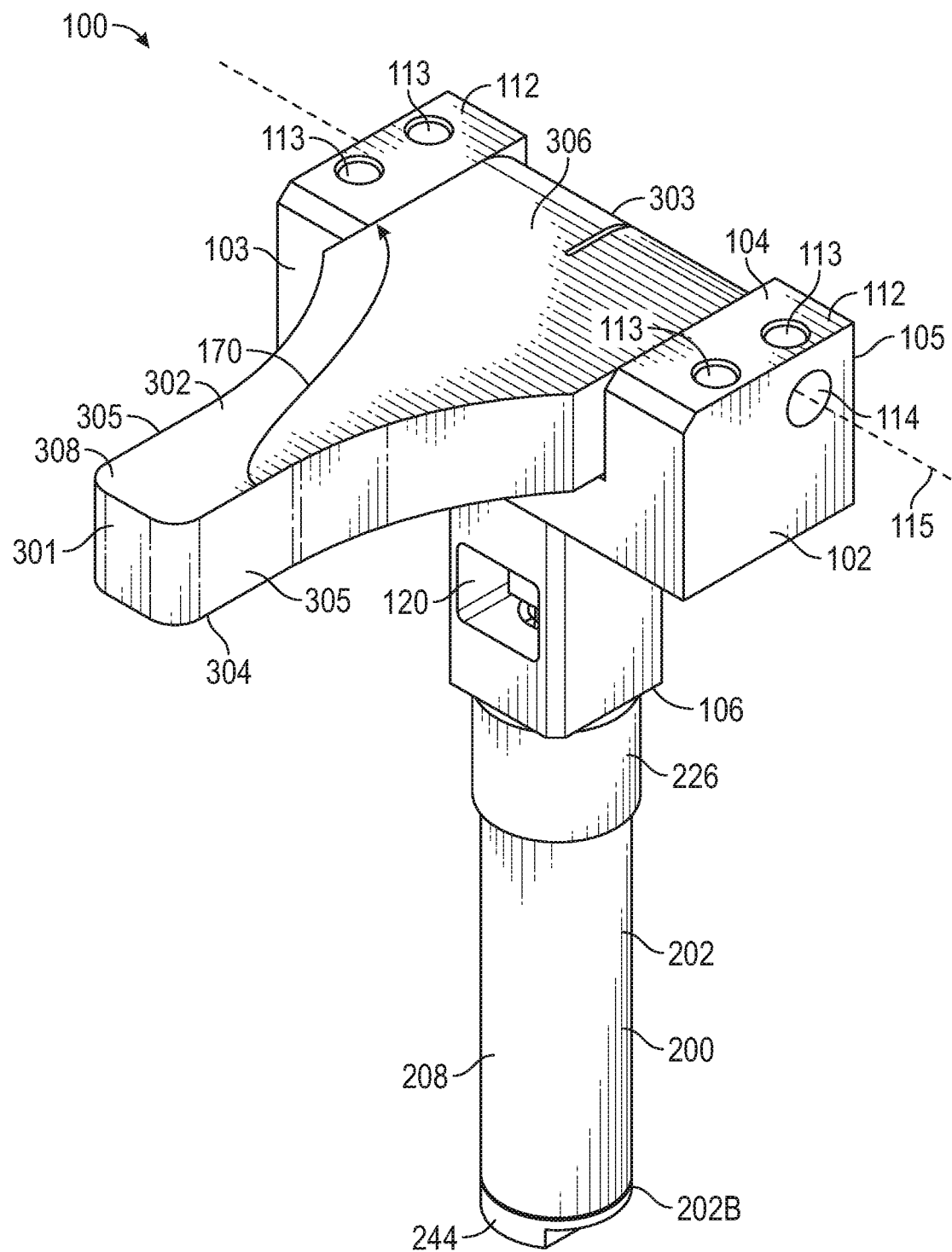
FIG. 3 is a perspective view of an embodiment of an actuatable fingerboard latch of the fingerboard assembly of FIG. 2 in accordance with principles disclosed herein.
Figure 4:
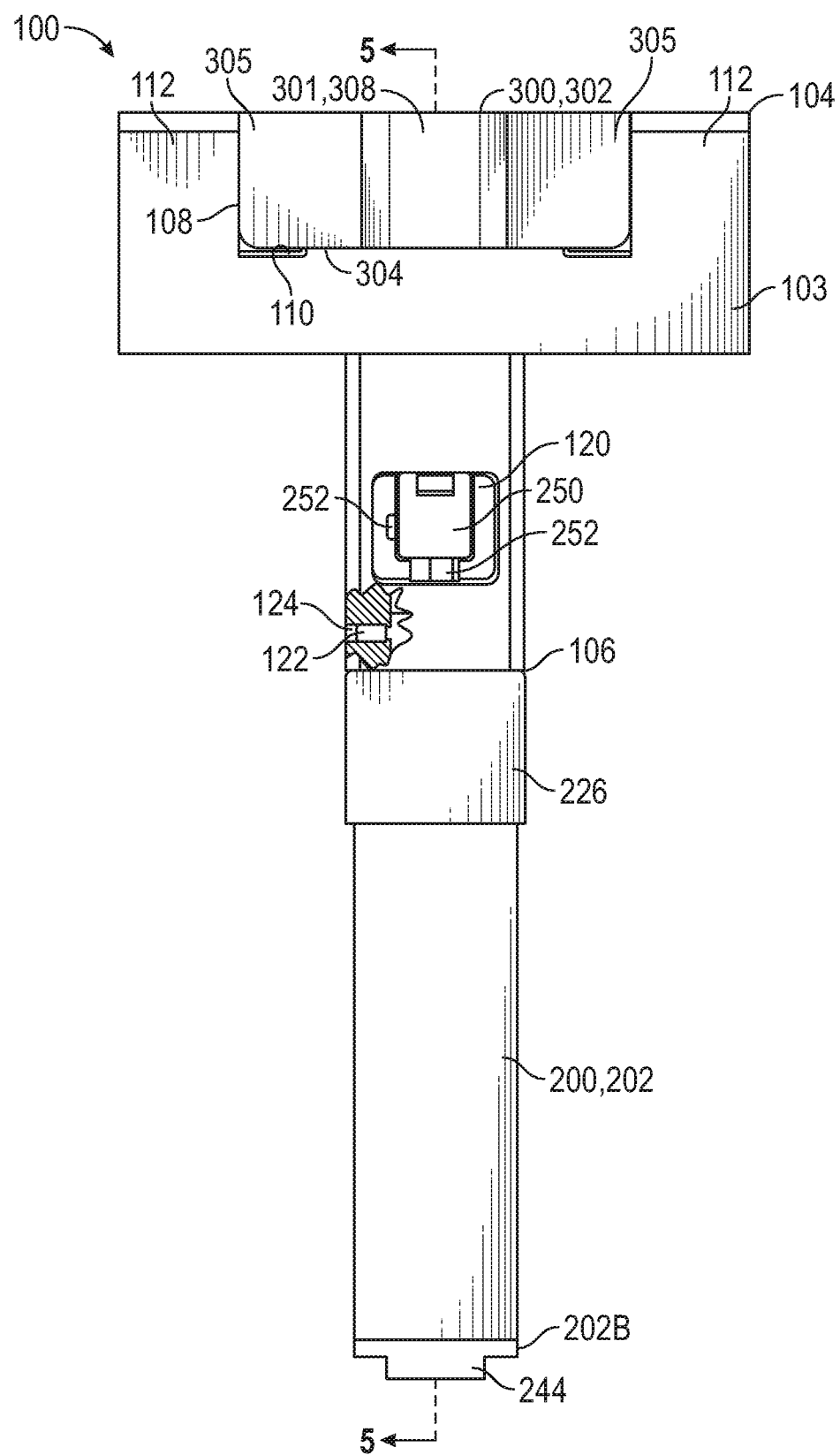
FIG. 4 is a front view of the fingerboard latch of FIG. 3.
Figure 5:
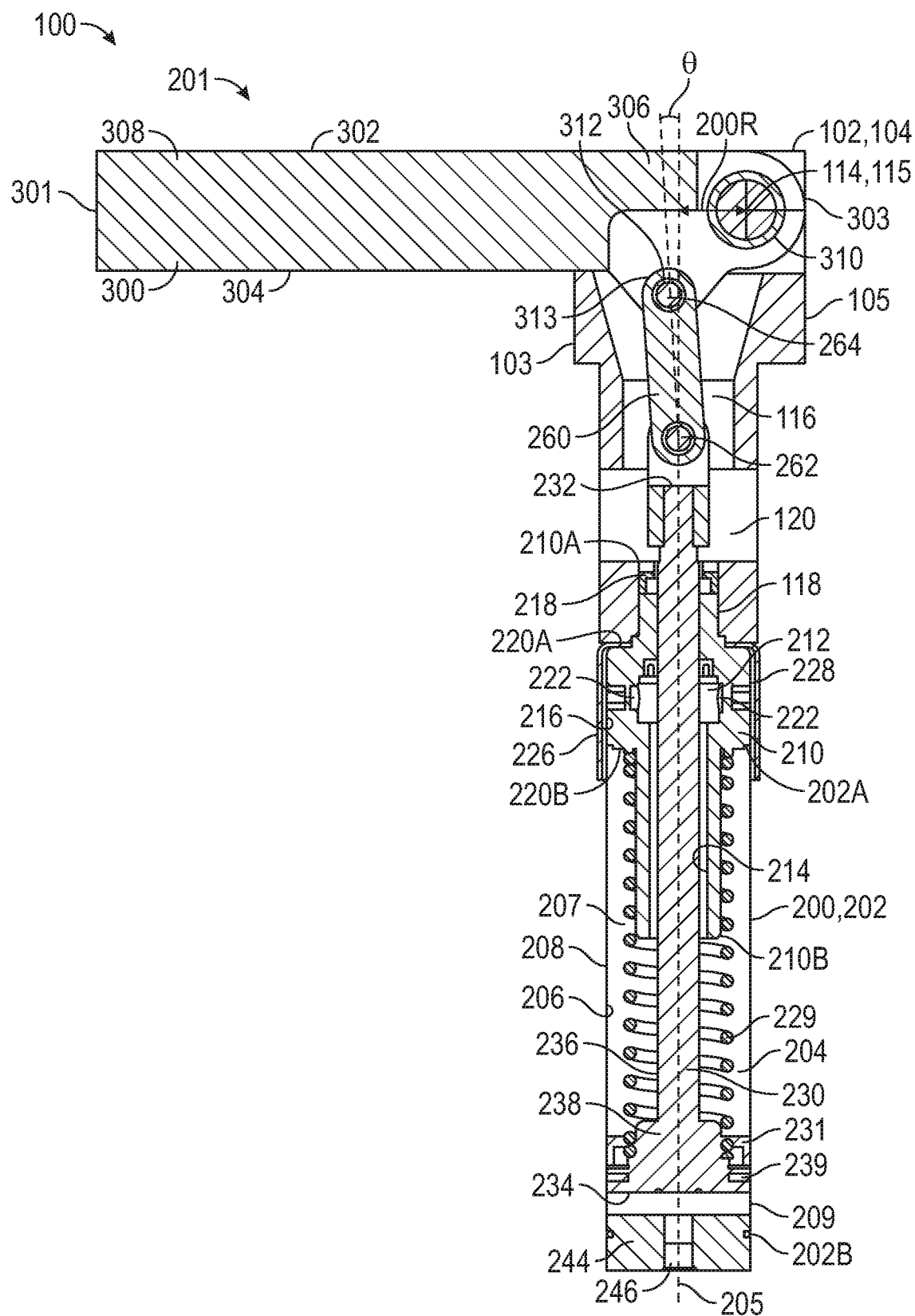
FIG. 5 is a cross-sectional view along line 5-5 of FIG. 4 of the fingerboard latch of FIG. 3.
Figure 6:
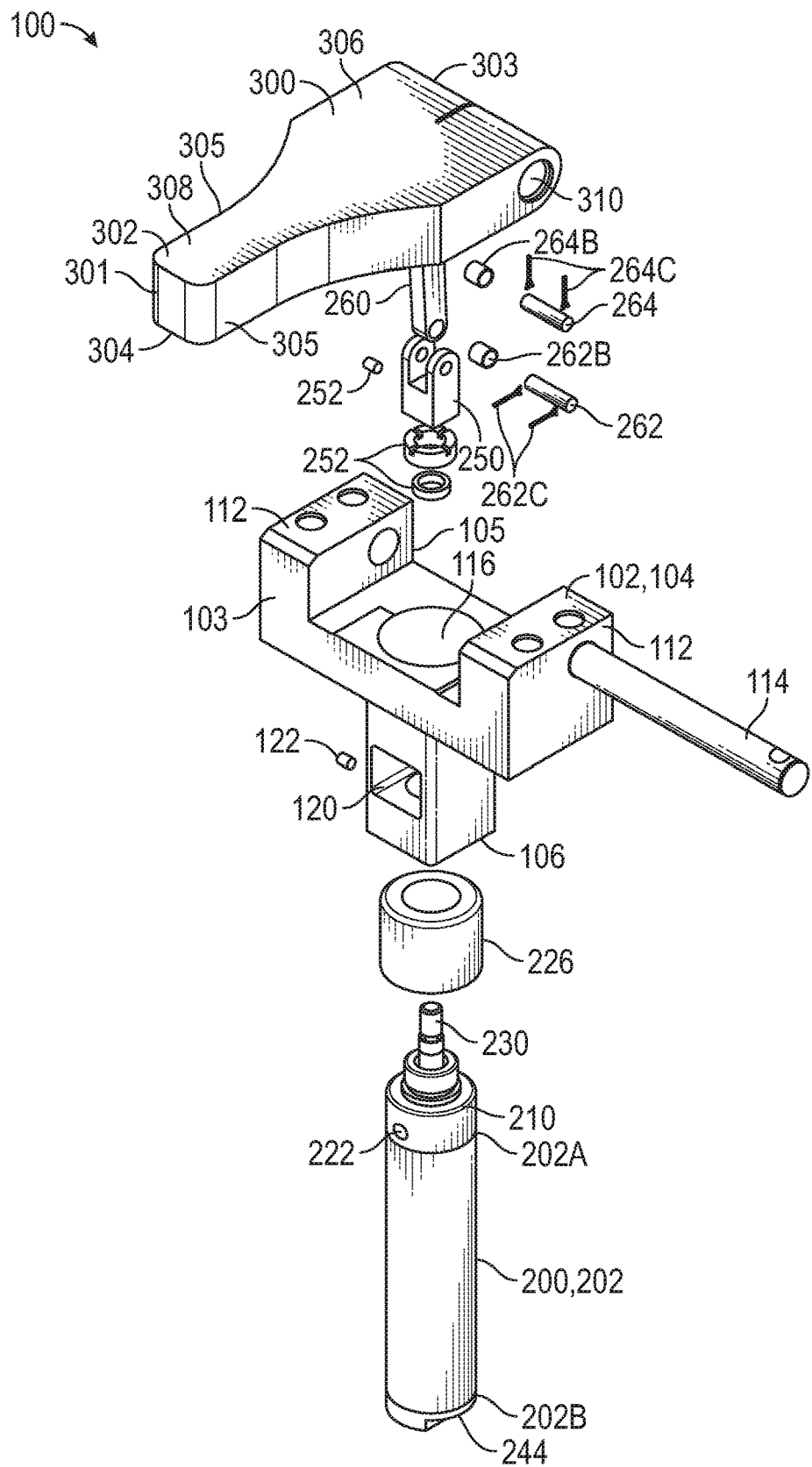
FIG. 6 is an exploded view of the fingerboard latch of FIG. 3.
Figure 7:
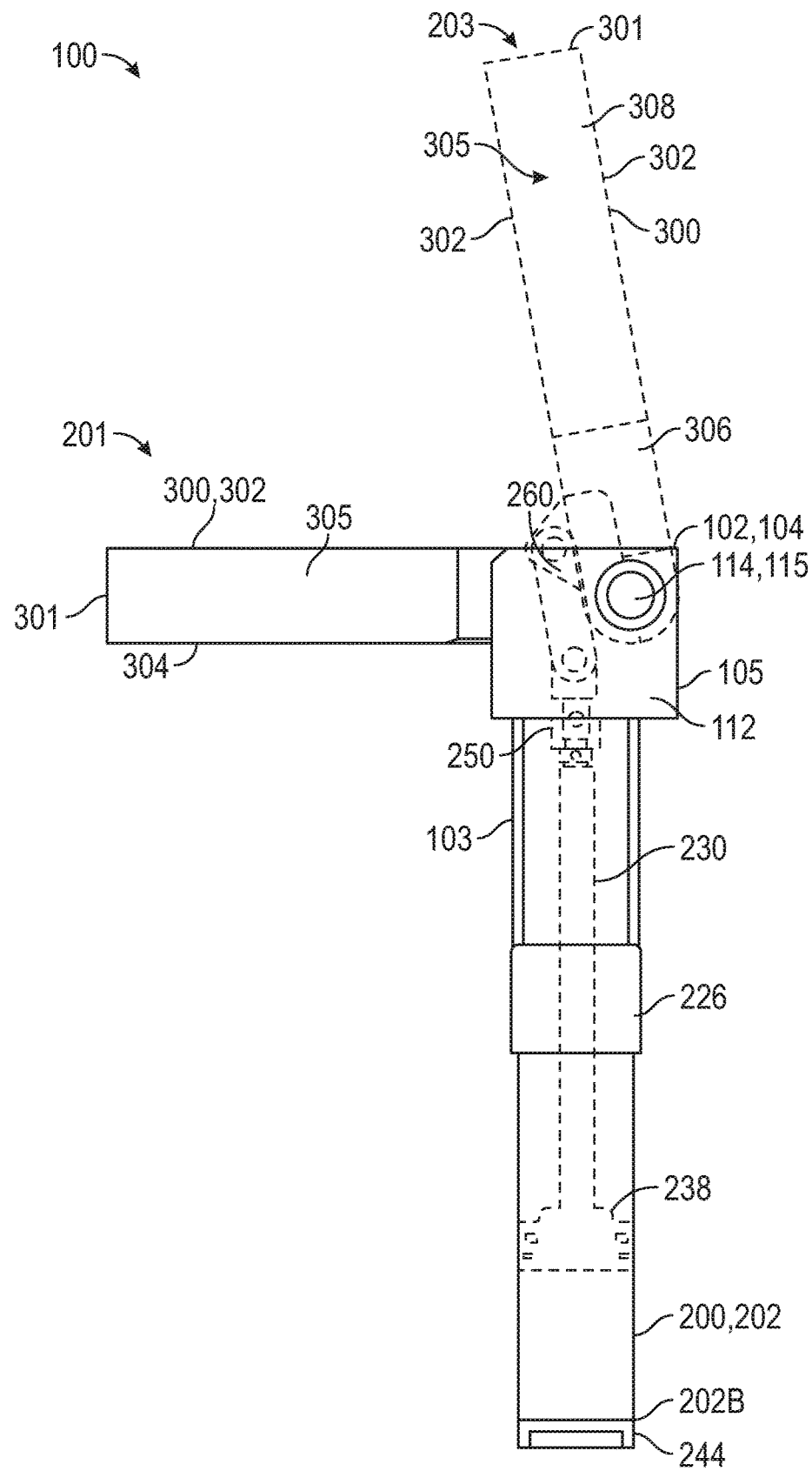
FIG. 7 is a side view illustrating first and second positions of the fingerboard latch of FIG. 3.

In operation, finger member 300 may be subjected to both shear and bending loads from tubular members (e.g., drill pipes 16) engaging the lateral sides 305 of the finger extension portion 308 of finger member 300. With main body portion 306 of finger member 300 extending entirely through (i.e., entirely between inner lateral end 103 and outer lateral end 105 of latch body 102) finger slot 108 of latch body 102, the shear and bending loads applied to finger member 300 may be efficiently transmitted to latch body 102 via physical engagement between the lateral sides 305 of main body 306 and arms 112 of latch body 102, while also reducing the relative amount of bending and shear loads transferred to pin 114 from finger member 300. For instance, an exemplary load path 170 is shown in FIG. 3, where load patch 170 represents a force applied against finger member 300 from a tubular member (not shown) contacting a lateral side 305 of finger extension portion 308. Load path 170 is transmitted through finger extension portion 308 of finger member 300 to main body 306, and from main body 306 to one of the arms 112 of latch body 102. In this manner, finger member 300 may be subjected to relatively greater bending and shear loads without failing due to the load transfer between finger member 300 and the arms 112 of latch body 102. Particularly, given that pin 114 and rotational axis 115 are offset towards the outer lateral end 105 of latch body 102 (pin 114 is disposed proximal outer lateral end 105 and distal inner lateral end 103), the length of load path 170 between finger extension portion 170 and arm 112 is reduced, thereby reducing the lever arm formed between latch body 102 and finger member 300, and, in-turn, the amount of bending applied to finger member 300 from the force directed along load path 170. In some embodiments, the finger extension portion 308 of finger member 300 may include a plurality of spaced apertures (e.g., similar in configuration to apertures 113 of latch body 102) for reducing the weight of finger member 300.

Figure 8:
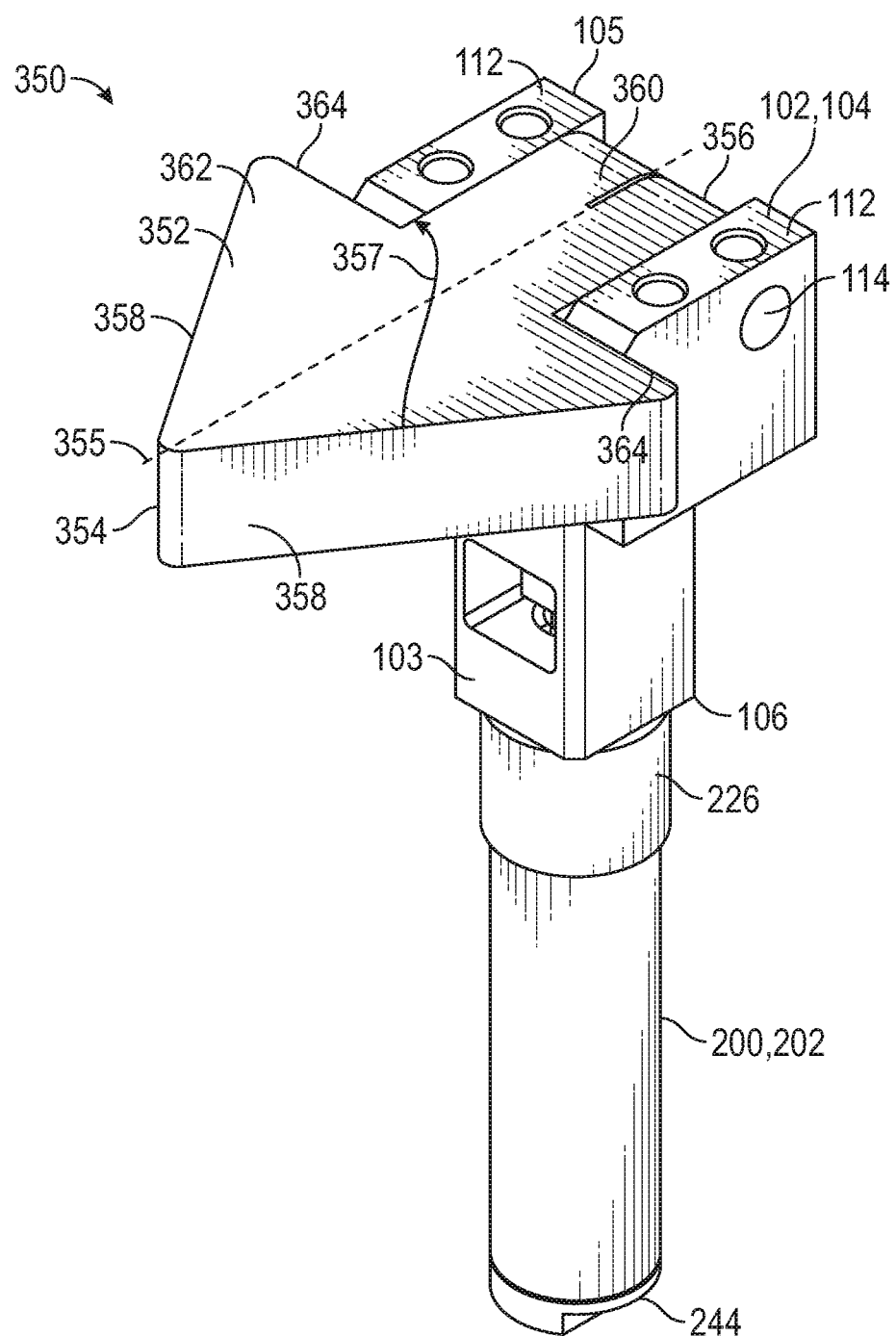
FIG. 8 is a perspective view of another embodiment of an actuatable fingerboard latch of the fingerboard assembly of FIG. 2 in accordance with principles disclosed herein.

Referring to FIGS. 2 and 8, another embodiment of a fingerboard latch assembly 350 of the fingerboard assembly 50 of FIG. 2 is shown in FIG. 8. Fingerboard latch assembly 350 includes features in common with fingerboard latch assembly 100 shown in FIGS. 3-7, and shared features are labeled similarly. In the embodiment of FIG. 8, fingerboard latch assembly 350 comprises a finger member 352 having an inner end 354, an outer end 356, and a pair of lateral sides 358. Finger member 352 includes a main body portion 360 extending from outer end 356 and a finger extension portion 362 extending from inner end 354. In this embodiment, the main body 360 of finger member 352 has a smaller lateral width (i.e., the distance between lateral sides 358) than finger extension 362, forming a pair of shoulders 364 therebetween. Additionally, in this embodiment, the lateral sides 358 of finger extension 362 are disposed at angles relative a longitudinal or central axis of finger member 352.

In some embodiments, finger member 352 is configured for receiving bending loads from relatively larger diameter tubular members, including 20" casing joints and the like, whereas, in some embodiments, finger member 300 of the fingerboard latch 100 shown in FIGS. 3-7 is configured for receiving bending loads from relatively smaller diameter pipe, including 10" drill collars. The increased diameter of the tubular members engaged by finger member 352 increases the length of the lever arm formed along a load path 357 that represents a force applied by the tubular member against finger member 352. However, the geometry of finger member 352 is configured to reduce the amount of bending applied to finger member 352 from the force conducted on load path 357. Particularly, lateral sides 358 of finger extension 362 are sloped or angled relative to a central or longitudinal axis 355 of finger member 352, thereby reducing the amount of bending applied against finger member 352 from the load transmitted along load path 357. Additionally, shoulders 364 allow for a portion of the force directed along load path 357 to be applied directly against the inner lateral end 103 of latch body 102, further reducing the amount of bending applied against finger member 352. In this arrangement, the transfer of shear or bending loads applied to the sides of finger extension 362 to latch body 106 may be maximized.

Figure 10:
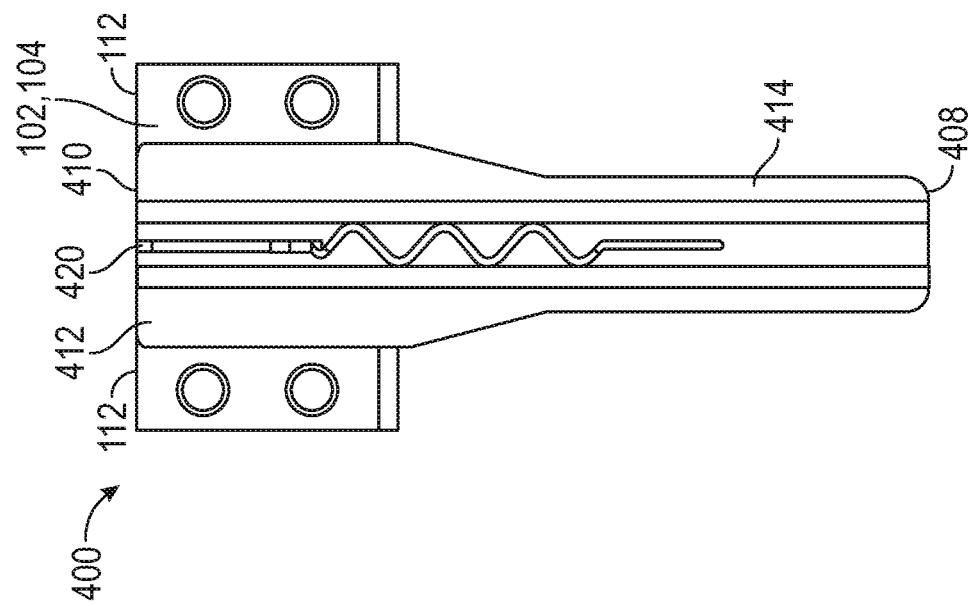
FIG. 10 is a top view of the fingerboard latch of FIG. 9.
Figure 9:
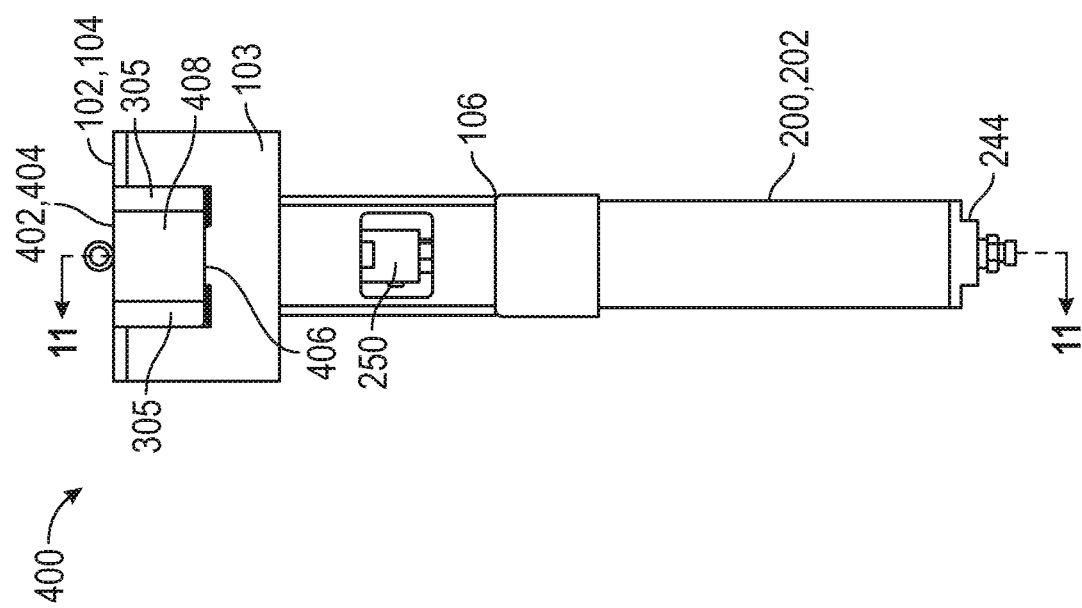
FIG. 9 is a front view of another embodiment of an actuatable fingerboard latch of the fingerboard assembly of FIG. 2 in accordance with principles disclosed herein.
Figure 11:
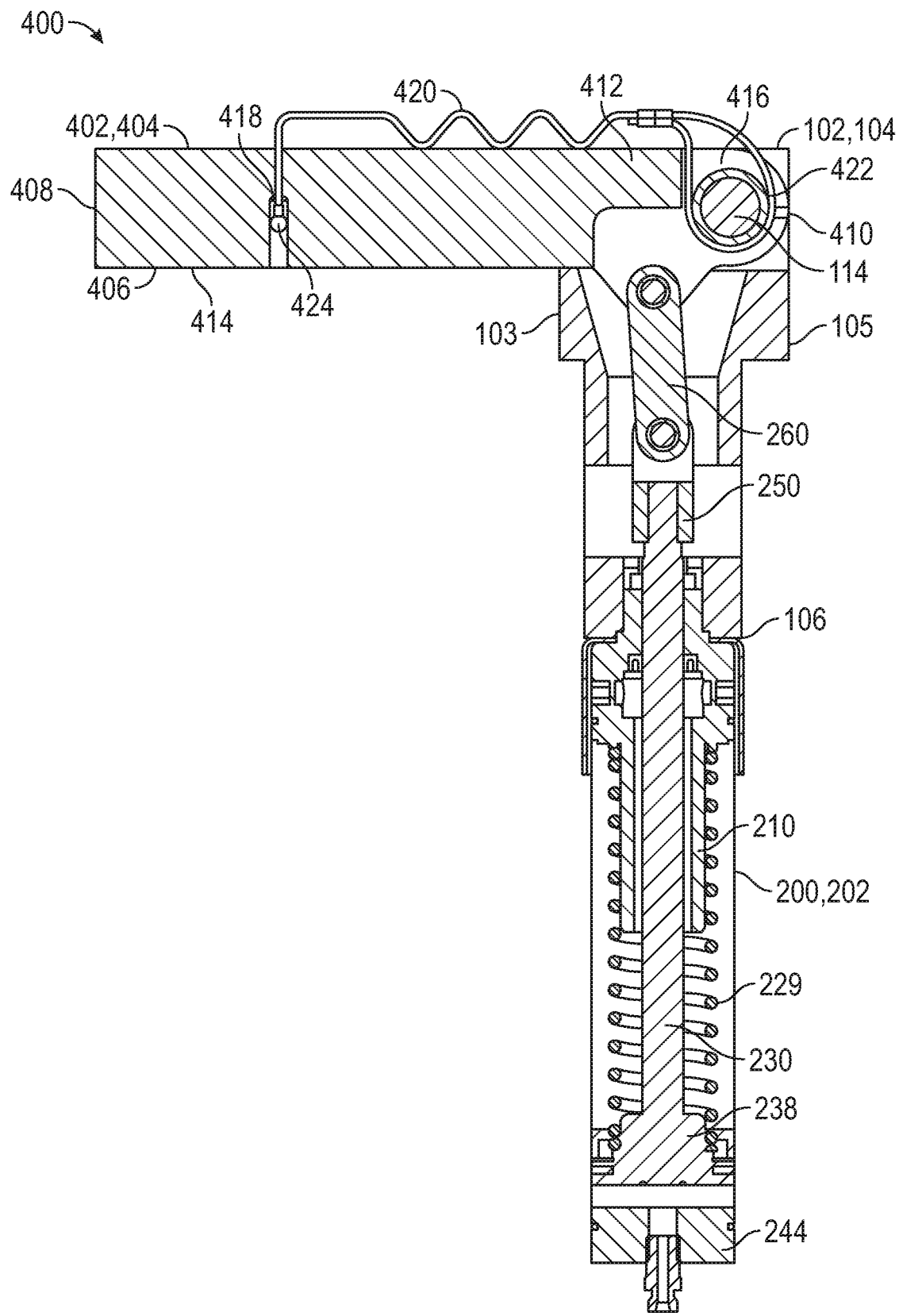
FIG. 11 is a cross-sectional view along line 11-11 of FIG. 9 of the fingerboard latch of FIG. 9.

Referring to FIGS. 2 and 9-11, another embodiment of a fingerboard latch assembly 400 of the fingerboard assembly 50 of FIG. 2 is shown in FIGS. 9-11. Fingerboard latch assembly 400 includes features in common with fingerboard latch assembly 100 shown in FIGS. 3-7, and shared features are labeled similarly. In the embodiment of FIGS. 9-11, fingerboard latch assembly 400 comprises a finger member 402 having an upper end 404, a lower end 406, an inner end 408, and an outer end 410. Finger member 402 also includes a main body portion 412 extending from outer end 410 and a finger extension portion 414 extending from inner end 408. In this embodiment, finger member 402 includes a flexible tether or retention cable 420 having a first end 422 wrapped about pin 114 via a slot 416 extending into the upper end 404 of finger member 402, and a second end 424 that is received in a receptacle 418 formed in the finger extension portion 414 of finger member 402. In some embodiments, finger member 402 is configured for engaging drill pipes, such as 6"-7" drill pipes and the like. Although finger member 300 of FIGS. 3-7 and finger member 352 of FIG. 8 are not shown as including a retention cable, such as tether 420, in some embodiments, finger members 300 and 352 may each include tether 420.

In some embodiments, finger extension portion 414 may be made from a frangible material having a lower yield stress than the material comprising main body portion 412. In this configuration, finger extension portion 414 is configured to fail or break from main body 412 in response to the application of a sufficient or threshold bending and/or shear load applied to finger extension portion 414, where the threshold load is greater than the load applied to finger member 402 during normal operating conditions. Additionally, tether 420 prevents finger extension portion 414 from falling to the rig floor 12 in the event of a breaking of finger extension portion 414 in response to the application of the threshold load.

Figure 13:
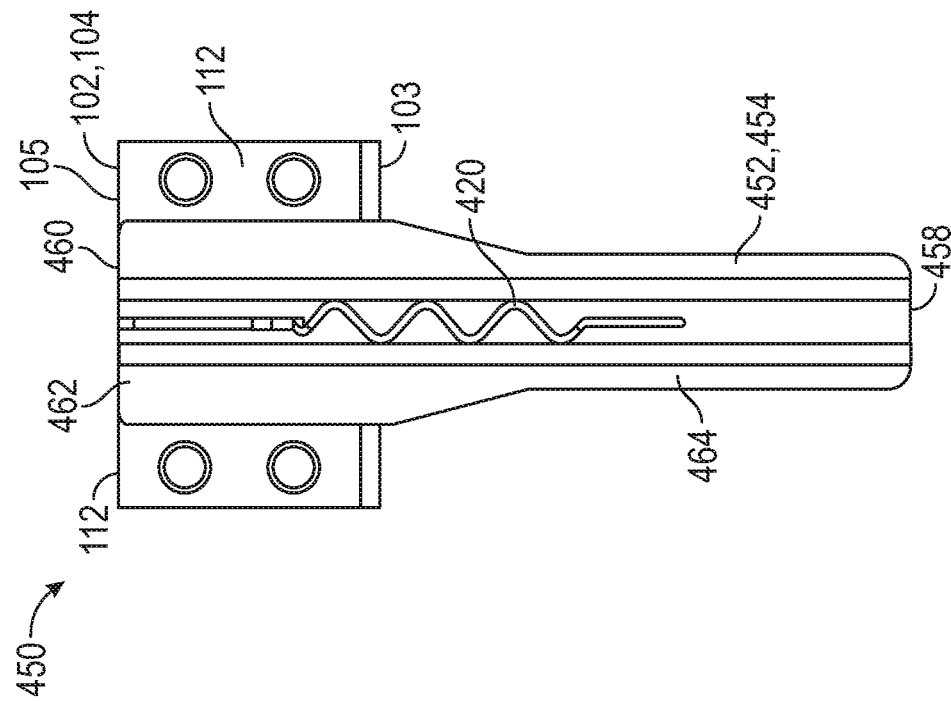
FIG. 13 is a top view of the fingerboard latch of FIG. 12.
Figure 12:
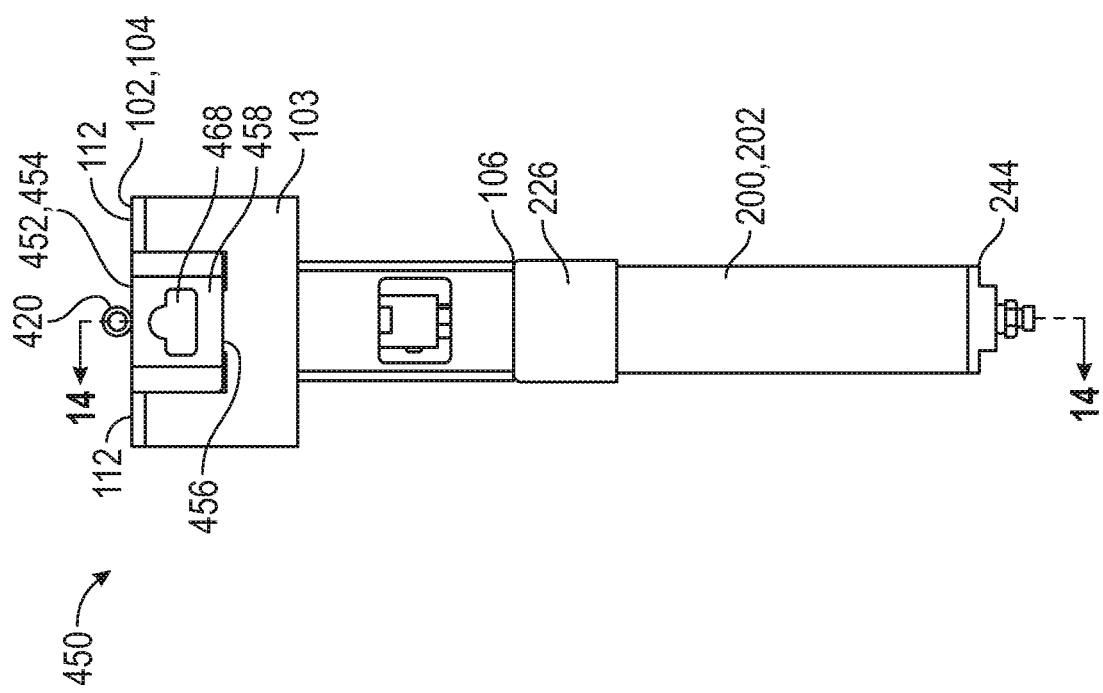
FIG. 12 is a front view of another embodiment of an actuatable fingerboard latch of the fingerboard assembly of FIG. 2 in accordance with principles disclosed herein.
Figure 14:
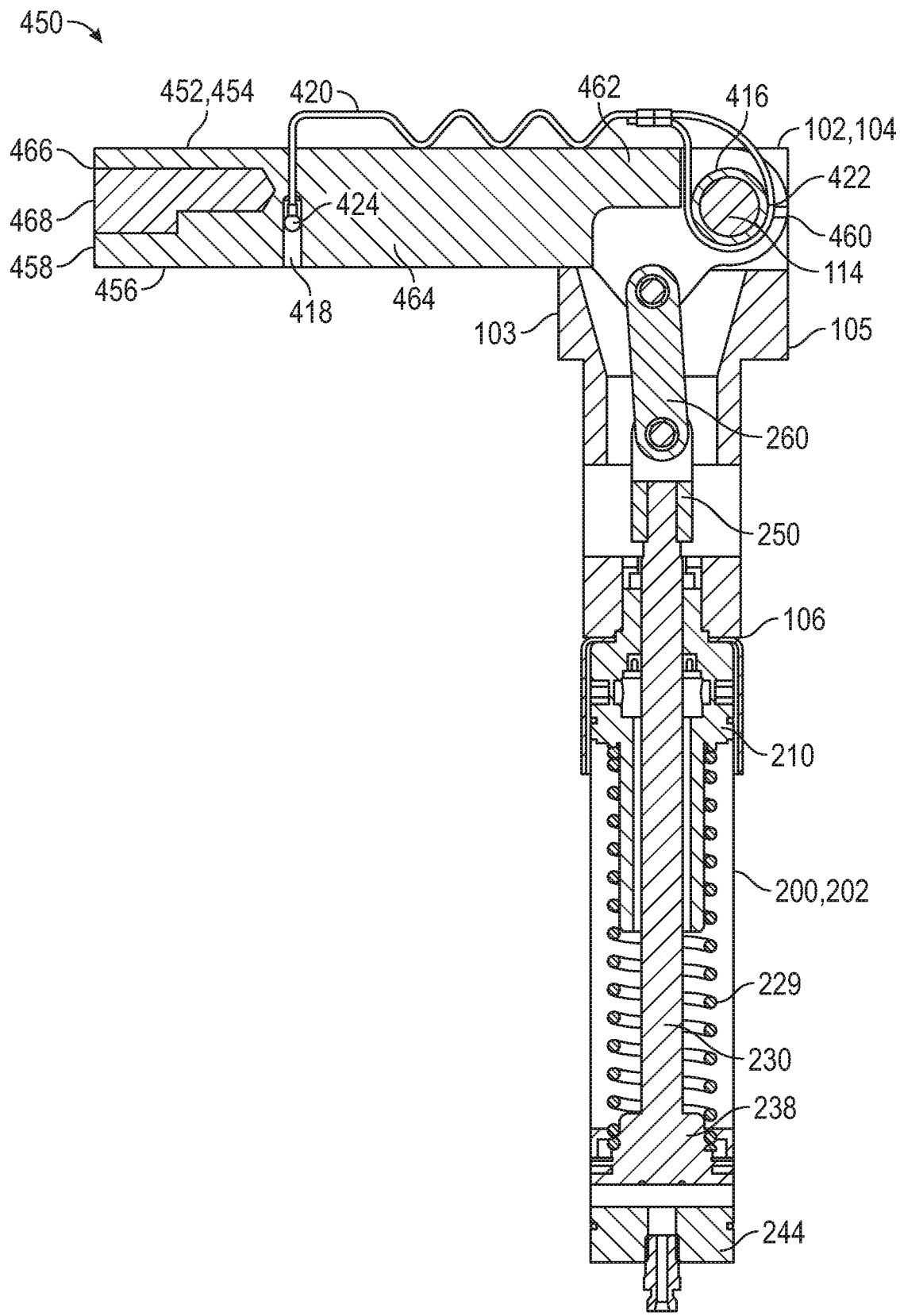
FIG. 14 is a cross-sectional view along line 14-14 of FIG. 12 of the fingerboard latch of FIG. 12.

Referring to FIGS. 2 and 12-14, another embodiment of a fingerboard latch assembly 450 of the fingerboard assembly 50 of FIG. 2 is shown in FIGS. 12-14. Fingerboard latch assembly 450 includes features in common with fingerboard latch assembly 100 shown in FIGS. 3-7 and fingerboard latch assembly 400 shown in FIGS. 9-11, and shared features are labeled similarly. In the embodiment of FIGS. 12-14, fingerboard latch assembly 450 comprises a finger member 452 having an upper end 454, a lower end 456, an inner end 458, and an outer end 460. Finger member 452 also includes a main body portion 462 extending from outer end 460 and a finger extension portion 464 extending from inner end 458.

In this embodiment, finger member 452 includes a receptacle 466 extending into inner end 458 that receives a position sensor assembly 460 configured to detect the position (e.g., open or closed) of finger member 452. In some embodiments, position sensor assembly 460 comprises a sensor for detecting the orientation (relative to the ground or waterline) of finger member 452, such as an accelerometer, where the orientation of finger member 452 corresponds to whether finger member 452 is in the open or closed positions. In some embodiments, position sensor assembly 460 includes a transmitter, such as a wired or wireless transmitter, for transmitting the position of finger member 452, as measured by sensor assembly 460, to a control or observation system of drilling system 10 for monitoring by personnel of drilling system 10, or to control or observation systems located offsite. In this manner, the position of finger member 452 may be remotely monitored by personnel of drilling system 10 without needing personnel to physically monitor fingerboard latch assembly 450 at the fingerboard assembly 50. to personnel of drilling system 10. In some embodiments, position sensor assembly 460 comprises a position sensor provided by Rice Electronics of Houston, Tex.

Figure 16:
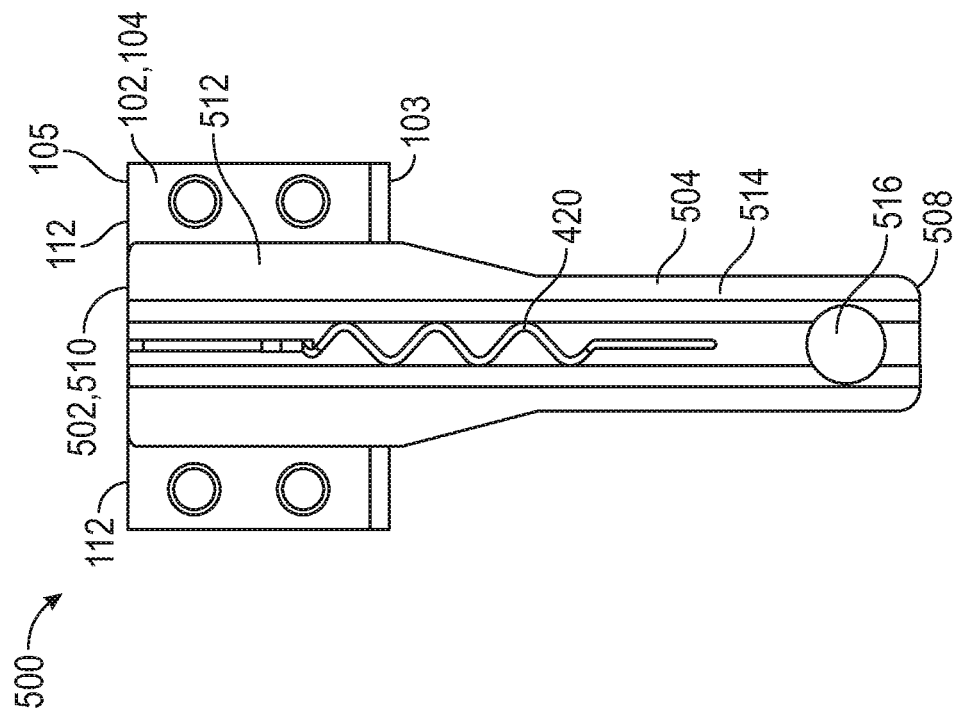
FIG. 16 is a top view of the fingerboard latch of FIG. 15.
Figure 15:
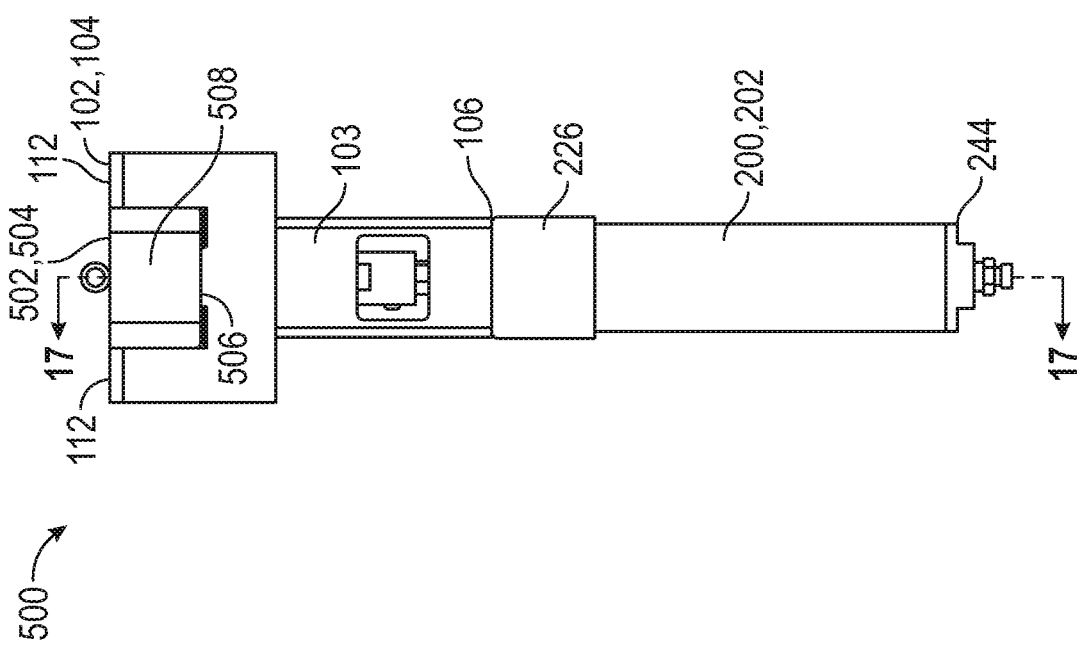
FIG. 15 is a front view of another embodiment of an actuatable fingerboard latch of the fingerboard assembly of FIG. 2 in accordance with principles disclosed herein.
Figure 17:
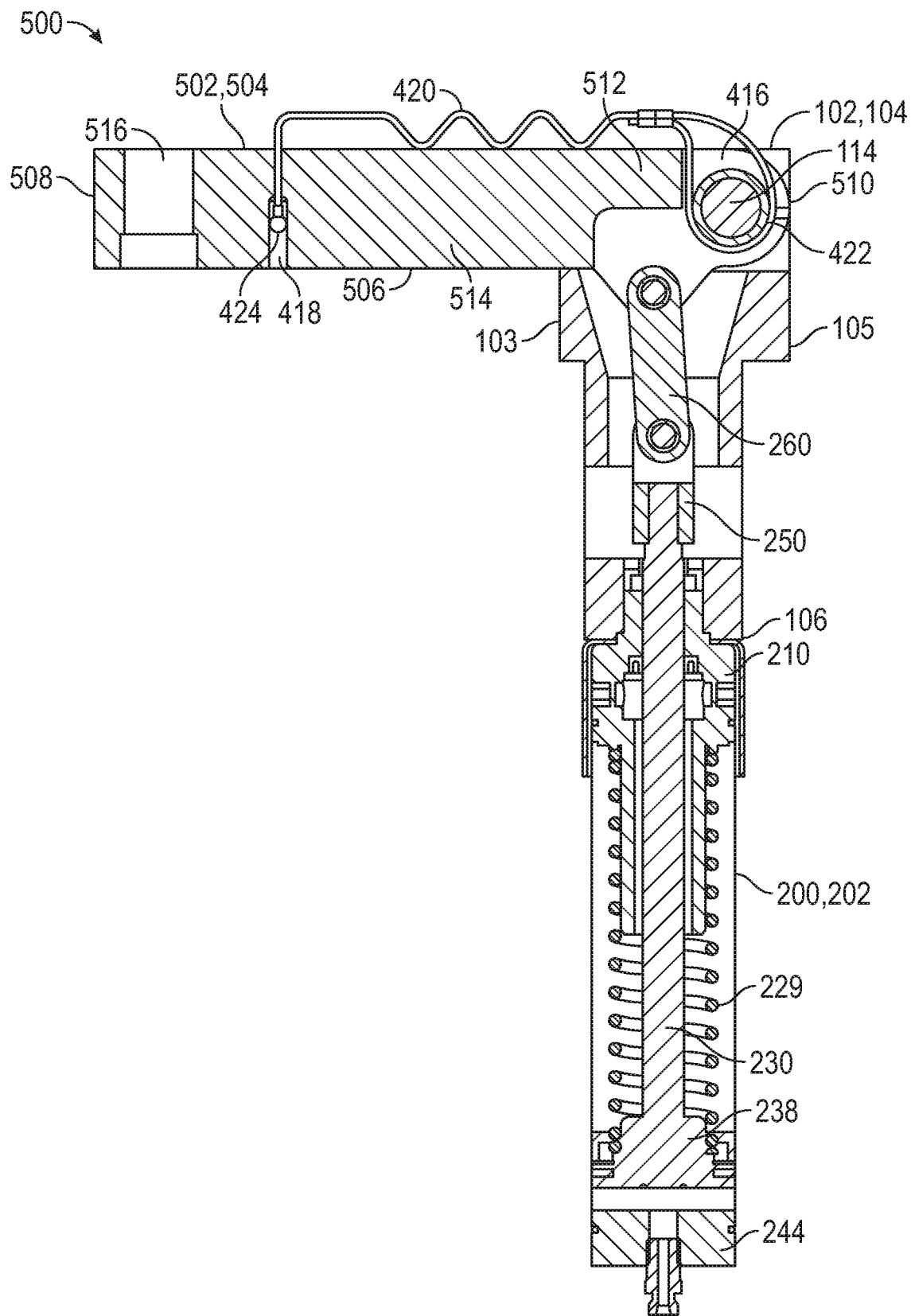
FIG. 17 is a cross-sectional view along line 17-17 of FIG. 15 of the fingerboard latch of FIG. 15.

Referring to FIGS. 2 and 15-17, another embodiment of a fingerboard latch assembly 500 of the fingerboard assembly 50 of FIG. 2 is shown in FIGS. 15-17. Fingerboard latch assembly 500 includes features in common with fingerboard latch assembly 100 shown in FIGS. 3-7, fingerboard latch assembly 400 shown in FIGS. 9-11, and shared features are labeled similarly. In the embodiment of FIGS. 15-17, fingerboard latch assembly 500 comprises a finger member 502 having an upper end 504, a lower end 506, an inner end 508, and an outer end 510. Finger member 502 also includes a main body portion 512 extending from outer end 510 and a finger extension portion 514 extending from inner end 508. In this embodiment, finger member 502 includes a receptacle 516 extending into finger extension portion 514 from upper end 504, and receives a position sensor for measuring and (in some embodiments) transmitting a measured position (e.g., open, closed, etc.) of finger member 502. Thus, finger member 502 provides a different mechanism for mounting a position sensor thereto than the means provided by the finger member 452 shown in FIGS. 12-14. Particularly, receptacle 516 provides an external means for mounting a position sensor, such as an accelerometer or other sensor configured for measuring a position of finger member 502, whereas receptacle 466 of finger member 452 provides an internal means for mounting a position sensor. In some embodiments, a wireless position sensor provided by Salunda Ltd. of Bicester, United Kingdom, is received in the receptacle 516 of finger member 502.

Figure 18:
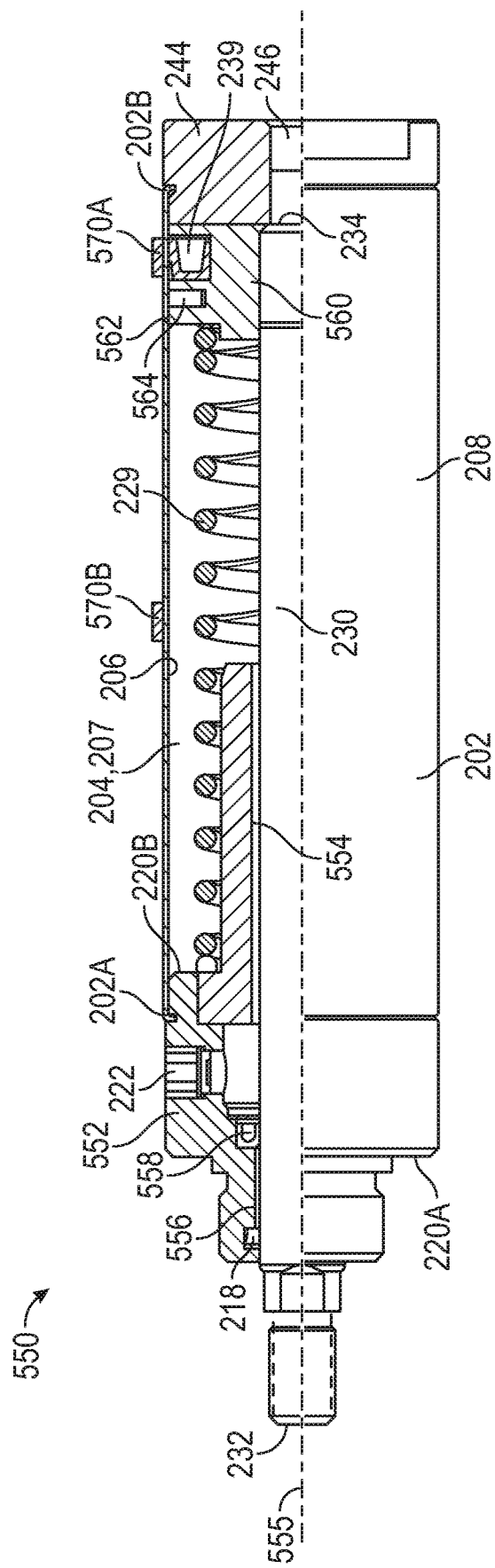
FIG. 18 is a partial side cross-sectional view of an embodiment of an actuator assembly of the fingerboard latch of FIG. 3 in accordance with principles disclosed herein.

In still other embodiments, the outer surface 236 of piston 238 may include sensor material and the inner surface 206 of cylinder 202 may include a first or lower sensor and a second or upper sensor. For instance, referring to FIG. 18, components of another embodiment of an actuator assembly 550 of the fingerboard latch assembly 100 of FIGS. 3-7 is shown in FIG. 18. Actuator assembly 550 includes features in common with the actuator assembly 200 shown in FIGS. 3-7, and shared features are labeled similarly. In the embodiment of FIG. 18, actuator assembly 550 has a central or longitudinal axis 555 and includes a piston rod guide 552 having a generally cylindrical inner surface 554. In this embodiment, inner surface 554 includes a cylindrical rod bearing 556 and a rod seal 558, where rod bearing 556 is positioned axially between wiper seal assembly 218 and rod seal 558. Rod bearing 556 reduces friction between piston rod 230 and rod guide 552 during the operation of actuator assembly 550. Additionally, as discussed above, wiper seal assembly 218 wipes or cleans the outer surface of piston rod 230 when the finger member (e.g., finger member 300) is actuated from the open position to the closed position. In this embodiment, wiper seal assembly 218 prevents dirt, mud, or other debris from contacting, and potentially damaging, rod bearing 556 and rod seal 558.

In this embodiment, actuator assembly 550 also includes a piston 560 coupled to a lower terminal end of piston rod 230, where piston 560 has a generally cylindrical outer surface 562 that includes an annular magnetic member 564 disposed therein, where magnetic member 564 comprises a magnetic material. Additionally, actuator assembly 550 comprises a pair of magnetic sensors 570A and 570B mounted to the outer surface of cylinder 202. In some embodiments, magnetic sensors 570A and 570B comprise Hall Effect sensors. Magnetic sensor 570A is axially aligned with magnetic member 564 when the finger member coupled to actuator assembly 550 is in the closed position, while magnetic sensor 570B is axially aligned with magnetic member 564 when the finger member coupled to actuator assembly 550 is in the open position. In this embodiment, each magnetic sensor 570A, 570B, is configured to output a position signal when magnetic member 564 of piston 560 is axially aligned therewith. In this manner, magnetic sensor 570A outputs a position signal indicating the closure of the finger member coupled to actuator assembly 550 while magnetic sensor 570B outputs a position signal indicating the opening of the finger member coupled to actuator assembly 550.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A fingerboard latch assembly, comprising:
a latch body;
a finger member pivotably connected to the latch body at a first pin; and
an actuator assembly coupled to the finger member and comprising:
  a piston rod having a first end coupled to the finger member and a second end comprising a piston face; and
  a biasing member extending around the piston rod and located entirely between the first end and the second end of the piston rod, wherein the biasing member is configured to provide a biasing force against the piston rod to actuate the finger member from an open position to a closed position;
wherein the actuator assembly is configured to actuate the finger member from the closed position to the open position in response to an application of fluid pressure to the piston face of the piston rod.

2. The fingerboard latch assembly of claim 1, wherein the actuator assembly comprises:
a cylinder, wherein the piston rod is slidably disposed in the cylinder; and
a link member pivotably coupled to the first end of the piston rod.

3. The fingerboard latch assembly of claim 2, wherein the piston rod comprises a piston disposed at the second end of the piston rod, and wherein the piston face comprises a circular piston face configured to receive fluid pressure from a sealed chamber disposed in the cylinder.

4. The fingerboard latch assembly of claim 2, wherein the finger member is pivotably coupled to the link member at a second pin.

5. The fingerboard latch assembly of claim 1, wherein the finger member comprises a main body portion and a finger extension portion, wherein the finger body portion comprises a greater lateral width than a lateral width of the finger extension portion.

6. The fingerboard latch assembly of claim 5, wherein the latch body comprises a slot extending between a pair of lateral sides of the latch body, and wherein the main body portion of the finger member is disposed in the slot of the latch body.

7. The fingerboard latch assembly of claim 1, wherein the finger member comprises a main body portion and a finger extension portion, and wherein a lateral side of the finger extension portion is disposed at an angle relative to a central axis of the finger member.

8. The fingerboard latch assembly of claim 7, wherein a shoulder is formed between the main body portion and the finger extension portion of the finger member.

9. A fingerboard latch assembly, comprising:
a latch body;
a finger member pivotably connected to the latch body at a first pin and comprising a first end and a second end opposite the first end; and
an actuator assembly coupled to the finger member, wherein the actuator assembly comprises a central axis and is configured to rotate the finger member about a rotational axis between a closed position and an open position;
wherein the central axis of the actuator assembly is laterally offset from the rotational axis, and wherein the first pin extends through the second end of the finger member and the central axis of the actuator assembly extends between the rotational axis and the first end of the finger member.

10. The fingerboard latch assembly of claim 9, wherein the actuator assembly comprises a piston slidably disposed in a cylinder, and wherein the piston comprises a central axis disposed coaxial with the central axis of the actuator assembly.

11. The fingerboard latch assembly of claim 10, wherein the actuator assembly is configured to actuate the finger member between the closed position and the open position in response to the application of fluid pressure to a terminal end of the piston.

12. The fingerboard latch assembly of claim 10, wherein the actuator assembly comprises:
a piston rod extending from the piston;
a rod link pivotably coupled to an end of the piston rod, and wherein the rod link is pivotably coupled to the finger member at a second pin.

13. The fingerboard latch assembly of claim 12, further comprising a piston rod guide coupled to an upper end of the cylinder, and wherein the piston rod guide comprises a wiper seal configured to wipe an outer surface of the piston rod.

14. The fingerboard latch assembly of claim 12, wherein the rod link comprises a central axis that is disposed at an angle relative to the central axis of the piston.

15. The fingerboard latch assembly of claim 10, wherein the piston comprises a circular piston face configured to receive fluid pressure from a sealed chamber disposed in the cylinder.

16. The fingerboard latch assembly of claim 9, wherein the finger member comprises a main body portion and a finger extension portion, wherein the finger body portion comprises a greater lateral width than a lateral width of the finger extension portion.

17. A fingerboard latch assembly, comprising:
a latch body;
a finger member pivotably connected to the latch body at a first pin; and
an actuator assembly coupled to the finger member and comprising:
a cylinder having a first end and a second end opposite the first end;
a piston rod extending through the first end of the cylinder and having a first end external the cylinder and coupled to the finger member and a second end comprising a piston slidably disposed in the cylinder; and
a biasing member disposed in the cylinder and configured to provide a biasing force against the piston rod urging the first end of the piston rod towards the first end of the cylinder;
wherein the actuator assembly is configured to actuate the finger member between a closed position and an open position in response to an application of fluid pressure to a terminal end of the piston.

18. The fingerboard latch assembly of claim 17, wherein the piston comprises a circular piston face configured to receive fluid pressure from a sealed chamber disposed in the cylinder.

19. The fingerboard latch assembly of claim 17, wherein the biasing member is configured to provide the biasing force against an annular shoulder of the piston to actuate the finger member from the open position to the closed position.

20. The fingerboard latch assembly of claim 17, further comprising a piston rod guide coupled to the cylinder, wherein the piston rod guide comprises a vent port configured to provide fluid communication between the cylinder and the surrounding environment.

21. The fingerboard latch assembly of claim 20, further comprising a cylindrical shroud covering the vent port of the piston rod guide.

22. The fingerboard latch assembly of claim 17, further comprising:
a receptacle extending into an inner end of the finger member;
a position sensor disposed within the receptacle, wherein the position sensor is configured to measure a position of the finger member.

* * * * *